(12) United States Patent
Dhulipala et al.

(10) Patent No.: US 10,174,240 B2
(45) Date of Patent: Jan. 8, 2019

(54) HYDROCARBON WELL TREATMENT METHODS AND FLUIDS

(71) Applicant: Baker Hughes Incorporated, Houston, TX (US)

(72) Inventors: Prasad D. Dhulipala, Austin, TX (US); C. David Armstrong, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/613,721

(22) Filed: Jun. 5, 2017

(65) Prior Publication Data

US 2017/0267917 A1    Sep. 21, 2017

Related U.S. Application Data

(62) Division of application No. 14/557,041, filed on Dec. 1, 2014, now Pat. No. 9,683,166.

(51) Int. Cl.
*C09K 8/68* (2006.01)
*C09K 8/86* (2006.01)
*C09K 8/88* (2006.01)

(52) U.S. Cl.
CPC ............ *C09K 8/68* (2013.01); *C09K 8/685* (2013.01); *C09K 8/86* (2013.01); *C09K 8/88* (2013.01); *C09K 8/887* (2013.01)

(58) Field of Classification Search
CPC ........................................... E21B 43/26
See application file for complete search history.

(56) References Cited

U.S. PATENT DOCUMENTS

| 3,603,397 | A | * | 9/1971 | Peray .................... C09K 8/588 166/256 |
|---|---|---|---|---|
| 3,818,991 | A | | 6/1974 | Nimerick |
| 4,552,674 | A | | 11/1985 | Brown et al. |
| 6,242,390 | B1 | | 6/2001 | Mitchell et al. |
| 7,621,335 | B2 | | 11/2009 | Valeriano et al. |
| 2004/0116350 | A1 | | 6/2004 | Wentworth et al. |
| 2008/0173452 | A1 | | 7/2008 | Sanders et al. |
| 2009/0044945 | A1 | | 2/2009 | Willberg et al. |
| 2009/0169630 | A1 | | 7/2009 | Ward et al. |
| 2010/0263867 | A1 | | 10/2010 | Horton et al. |
| 2012/0031618 | A1 | | 2/2012 | Armstrong et al. |

(Continued)

OTHER PUBLICATIONS

U.S. Patent and Trademark Office; Office Action for U.S. Appl. No. 14/557,041 dated Sep. 27, 2016.

(Continued)

*Primary Examiner* — Angela M DiTrani Leff
*Assistant Examiner* — Avi T Skaist
(74) *Attorney, Agent, or Firm* — Parsons Behle & Latimer

(57) ABSTRACT

A treatment method for a hydrocarbon well includes placing a well treatment fluid containing a viscosifying agent in the well and, using the viscosifying agent, attaining a first viscosity of the fluid in the well. The method includes combining a porphyrin compound with the fluid and, using the porphyrin compound, decreasing viscosity of the fluid in the well to a second viscosity less than the first viscosity. A hydrocarbon well treatment fluid includes an aqueous carrier fluid, a polymer viscosifying agent, and a chlorophyll compound.

18 Claims, 8 Drawing Sheets

(56) References Cited

U.S. PATENT DOCUMENTS

2012/0285685 A1 11/2012 Gupta
2014/0251610 A1 9/2014 Brannon et al.

OTHER PUBLICATIONS

U.S. Patent and Trademark Office; Office Action for U.S. Appl. No. 14/557,041 dated Jun. 23, 2015.
U.S. Patent and Trademark Office; Office Action for U.S. Appl. No. 14/557,041 dated Jan. 5, 2016.
Sippola, Vaino, Transition Metal-Catalysed Oxidation of Lignin Model Compounds for Oxygen Delignification of Pulp, Industrial Chemistry Publication Series No. 21, dated Mar. 3, 2006.
Schertz (The Extraction and Separation of Chlorophyll, 1928) 1928.
Bean et al. (Carbohydrate Oxidase from a Red Alga) 1955.
W.M. Bayliss, "The Nature of Enzyme Action", Fourth Edition, California College of Pharmacy 1919.
Encyclopedia Britannica Online (Porphyrin) 2015.

* cited by examiner

HYDROCARBON WELL TREATMENT METHODS AND FLUIDS

CROSS REFERENCE TO RELATED APPLICATIONS

This application is a divisional of and claims priority to U.S. patent application Ser. No. 14/557,041, filed on Dec. 1, 2014, entitled "Hydrocarbon Well Treatment Methods and Fluids," which is incorporated herein by reference.

BACKGROUND

Wells drilled in low-permeability subterranean formations are often treated by reservoir stimulation techniques, such as hydraulic fracturing, to increase hydrocarbon production rate. High viscosity fluids may be employed to carry proppant down-hole to prop open fractures in the formation. Known linear gels (water containing a gelling agent without cross-linker) that can be operated at ambient temperature at the surface generally do not exhibit a sufficiently high viscosity to transfer proppant of a large size or large quantity. Consequently, cross-linkers may be used to increase fluid viscosity, providing adequate transport of larger proppant sizes or larger proppant quantity. Higher viscosity fluids also create wider fractures within the formation.

Guar and guar derivatives are among the most often used viscosifying agents, such as polymers, in hydraulic fracturing treatment. Guar derivatives, such as carboxymethyl guar (CMG) and carboxymethyl hydroxypropyl guar (CMHPG), are predominantly used in wells with a high bottom-hole temperature (BHT). Interest in cellulose derivatives, such as hydroxyethyl cellulose (HEC), carboxymethyl cellulose (CMC), and carboxymethyl hydroxyethyl cellulose (CM-HEC), has increased for fracturing treatment due to the natural abundance of cellulose.

Often, hydraulic fracturing gels include cross-linking delay additives, gel breakers, and fluid loss control additives among many other possible additives to adapt hydraulic fracturing gel to the circumstances of hydraulic fracturing. A variety of gelling agents and cross-linkers are known for use in hydraulic fracturing gel. For a delay additive, cross-linking reactions are so designed that viscosity development begins after placement of hydraulic fracturing gel deep within a well.

In a related manner, rheology modifiers, such as gel breakers, may be included in hydraulic fracturing gel to significantly decrease viscosity after fracturing for easier removal of the gel from the well. To the extent that the cross-linked gel contains a gel breaker, the gel breaker may be configured for delayed action to maintain desirable properties of the cross-linked gel while fracturing. Even so, additional rheology modifiers, such as gel breakers, are desired to provide an increased variety of options for interacting with viscosifying agents and related components.

SUMMARY

A treatment method for a hydrocarbon well includes placing a well treatment fluid containing a viscosifying agent in the well and, using the viscosifying agent, attaining a first viscosity of the fluid in the well. The method includes combining a porphyrin compound with the fluid and, using the porphyrin compound, decreasing viscosity of the fluid in the well to a second viscosity less than the first viscosity.

A treatment method for a hydrocarbon well includes placing a well treatment fluid containing a polymer viscosifying agent in the well and, using the viscosifying agent, attaining a first viscosity of the fluid in the well. The method includes hydraulically fracturing the well after attaining the first viscosity. A chlorophyll compound is combined with the fluid, and, using the chlorophyll compound, the viscosity of the fluid decreases in the well after the hydraulic fracturing to a second viscosity less than the first viscosity at a temperature of about 150° F. or greater, at a pressure greater than 15 psi, and at a pH of about 9.5 or greater. After the decrease in viscosity, the method includes removing the fluid from the well, the viscosity remaining substantially at the second viscosity or less throughout the removal and temperature of the fluid being less than 175° F. during at least part of the removal.

A hydrocarbon well treatment fluid includes an aqueous carrier fluid, a polymer viscosifying agent, and a chlorophyll compound.

BRIEF DESCRIPTION OF THE DRAWINGS

Some embodiments are described below with reference to the following accompanying drawings.

DETAILED DESCRIPTION

Figure 1A:
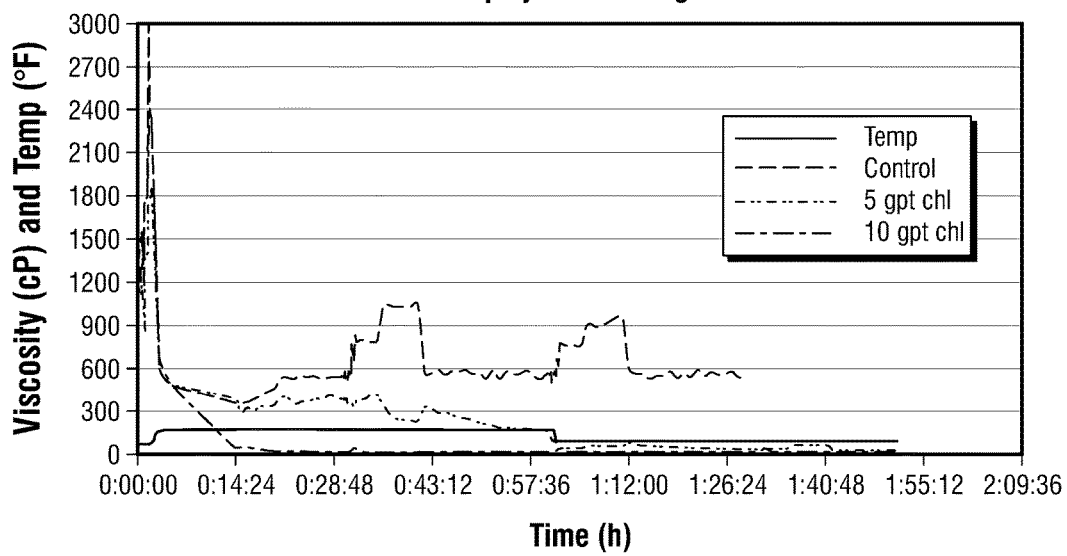
FIGS. 1A-1C, 2, 4-6, 7A, and 7B are charts of viscosity over time for polymer-containing fluids prepared with rheology modifiers respective to Examples 1, 2, and 4-7.

A rheology modifier, such as a gel breaker for cross-linked or linear gel, may be based on porphyrin. Porphyrin, which includes four modified pyrrole subunits forming a ring, has been shown to produce free radicals in alkaline conditions. Chlorophyll is an abundant, naturally-occurring porphyrin containing a $Mg^{2+}$ ion bound by pyrrole ligands in the porphyrin ring and is involved in photosynthetic reactions in plants. As a naturally available material with high biodegradability and very low toxicity, chlorophyll may have significant value as a breaker alternative.

Chlorophyll catalyzes carbohydrate synthesis in the presence of light and carbon dioxide. Without being limited to any particular theory, chlorophyll is theorized as a potential rheology modifier by producing hydrogen peroxide radicals or other radicals in alkaline environments, such as in borate cross-linked fracturing fluids. A few different forms of chlorophyll occur naturally, but chlorophyll A is the most prevalent in plants. The rheology modifier may be an aqueous extraction of chlorophyll from plant material.

Accordingly, a treatment method for a hydrocarbon well includes placing a well treatment fluid containing a viscosifying agent in the well and, using the viscosifying agent, attaining a first viscosity of the fluid in the well. The method includes combining a porphyrin compound with the fluid and, using the porphyrin compound, decreasing viscosity of the fluid in the well to a second viscosity less than the first viscosity.

Features and ranges for operational parameters of the various methods and compositions described herein may also be included in the present method as consistent and appropriate. By way of example, the viscosifying agent may include a polymer, whether cross-linked or linear, such as guar, CMG, CMC, HPG, and others. The fluid placed in the well may further contain a cross-linker of the viscosifying agent and attaining the first viscosity may include cross-linking the viscosifying agent. The cross-linker may contain a borate. Also, decreasing viscosity of the fluid may occur at a pH of about 8.5 or greater or 9 or greater, such as often occurs in the use of borate cross-linkers. A more specific pH range may be from about 9.5 to about 11. However, the Examples herein indicate that, in addition to pH, the viscosity decrease using a porphyrin compound may be influenced by porphyrin concentration, temperature, pressure, and polymer composition and concentration. It follows that a more specific pH range may vary somewhat depending on the other conditions.

The porphyrin compound may be a chlorophyll compound. The chlorophyll compound may be in the form of a liquid extract from plant material with the plant material strained therefrom. The Examples herein describe suitable extraction methodology. The use of the chlorophyll compound may include attaining a concentration of chlorophyll in the well treatment fluid of about 200 mg/L or greater, such as about 400 mg/L or greater, including about 1,000 mg/L or greater.

The method may further include hydraulically fracturing the well after attaining the first viscosity and before decreasing viscosity of the fluid in the well. Treating the well with the well treatment fluid may instead include gravel packing, sand control, or other known applications for viscosified well treatment fluid, such as gel. Not only may the porphyrin compound may be a rheology modifier, it may be a viscosity breaker, such as a cross-linked or linear gel breaker. Thus, decreasing viscosity of the fluid in the well may include breaking the fluid to the second viscosity, which is less than about 10 centiPoise (cP) at 100 seconds$^{-1}$ (sec$^{-1}$) or which is reduced by more than 80%, such as by more than 90%, from the first viscosity. Even though some viscosity remains, those of skill often consider a gel to be "broken" when reduced in viscosity by 80-90% or to about 10 cP at 100 sec$^{-1}$.

Compared to the well treatment fluid without the rheology modifier, viscosity may decrease at a faster rate. The numerical value for the decrease in viscosity and the time over which it occurs varies depending on the application. Consequently, the rate of decrease also varies. In field operations, the fluid viscosity can be very high (as in in gel plugs), just several hundred centiPoise (as in fracturing fluids), or just a few centiPoise (as in slick water). It will be appreciated that the larger viscosity decreases may occur in the higher viscosity fluids. Also, fluids may be formulated to break in 2 days, or to break in 2 hours. Even so, for the methods and compositions herein, the viscosity may decrease at a faster rate compared to known fluids and compared to the well treatment fluid herein without the rheology modifier.

In the method, decreasing viscosity of the fluid may occur at a temperature of about 75° F. or greater, such as about 75 to about 300° F., or about 150° F. or greater, such as about 150 to about 250° F., and at a pressure greater than 15 psi, such as greater than about 100 psi, including greater than about 2,000 psi.

After the decrease in viscosity of the fluid in the well to the second viscosity, the method may further include removing the fluid from the well. The fluid's viscosity may remain substantially at the second viscosity or less during the removal, indicating no regain in viscosity during removal. Further, during removal, temperature of the fluid may decrease to less than 175° F. and still not regain viscosity.

In more detail, a treatment method for a hydrocarbon well includes placing a well treatment fluid containing a polymer viscosifying agent in the well and, using the viscosifying agent, attaining a first viscosity of the fluid in the well. The method includes hydraulically fracturing the well after attaining the first viscosity. A chlorophyll compound is combined with the fluid, and, using the chlorophyll compound, the viscosity of the fluid decreases in the well after the hydraulic fracturing to a second viscosity less than the first viscosity at a temperature of about 150° F. or greater, at a pressure greater than 15 psi, and at a pH of about 9.5 or greater. After the decrease in viscosity, the method includes removing the fluid from the well, the viscosity remaining substantially at the second viscosity or less throughout the removal and temperature of the fluid being less than 175° F. during at least part of the removal.

Features and ranges for operational parameters of the various methods and compositions described herein may also be included in the present method as consistent and appropriate. By way of example, the fluid placed in the well may further contain a borate cross-linker of the viscosifying agent and attaining the first viscosity may include cross-linking the viscosifying agent. The chlorophyll compound may be in the form of a liquid extract from plant material with the plant material strained therefrom. Using the chlorophyll compound may include attaining a concentration of chlorophyll in the well treatment fluid of about 200 mg/L or greater. Decreasing viscosity of the fluid in the well may include breaking the fluid to the second viscosity, which is less than about 10 cP at 100 sec$^{-1}$. The temperature may be about 150 to about 250° F., the pressure may be greater than 100 psi, and the pH may be about 9.5 to about 11.

As will be appreciated from the methods herein, a hydrocarbon well treatment fluid includes an aqueous carrier fluid, a polymer viscosifying agent, and a chlorophyll compound. Features and ranges for operational parameters of the various methods and compositions described herein may also be included in the present composition as consistent and appropriate. By way of example, the fluid may further contain a borate cross-linker, the polymer being cross-linked and the well treatment fluid exhibiting a pH of about 9 or greater. The chlorophyll compound may be in the form of a liquid extract from plant material with the plant material strained therefrom and providing a concentration of chlorophyll in the well treatment fluid of about 200 mg/L or greater.

The well treatment fluid may contain additional components known for suitability in a selected fluid application, such as hydraulic fracturing. Examples include gel stabilizer, buffer, etc.

An investigation was conducted in demonstration of the methods and compositions described above. The aim of the resulting investigation was to evaluate leaf extract containing chlorophyll as a potential polymer breaker to replace chemicals known for use in hydraulic fracturing that may be toxic. Chlorophyll was also evaluated as a rheology modifier even if breaking did not occur. To these ends, the investigation described in the Examples herein was carried out.

EXAMPLES

Chlorophyll was obtained from crepe myrtle tree leaves, live oak tree leaves, and St. Augustine grass leaves and studied for breaker function using linear and cross-linked polymer. Results showed that chlorophyll (leaf extract) can be used as an effective breaker at a pH of about 9 and at a temperature of about 175° F., as well as higher pH and lower and higher temperature values, depending on the polymer and its concentration, as further described below. Chlorophyll concentration and fluid pressure also affected breaking.

Materials

1. Chlorophyll-containing leaf extract was prepared as a 10% wt./vol. solution prepared by blending leaves of crepe myrtle, live oak, or St. Augustine grass in tap water and filtering the ground extract using cheese cloth. Barley, spinach, wheat, spirulina, and alfalfa leaf powders available from Starwest Botanicals, Inc. in Sacramento, Calif. were evaluated as well as chlorophyll from CN Lab in China and SUNNY GREEN liquid chlorophyll available from Nutraceutical Corporation in Park City, Utah. The powders were used to make a 10% wt./vol. solution as with the leaf extract and then the powder extract was tested.

2. Polymers (available from Baker Hughes Inc. in Houston, Tex.): guar (GW-3LDF gellant); CMG (GW-45 gellant); CMC (GW-55LDF gellant); and hydroxypropyl guar (HPG) (GW-32LBF gellant). Cross-Linkers (each available from Baker Hughes Inc.): XLW-18 (zirconium), XLW-32 (borate), XLA-2 (aluminum oxide), and XLW-57 (zirconium).

3. Buffers with low and high pH were used directly or mixed with each other to achieve the pH ranges tested (available from Baker Hughes Inc.): BF-7L, BF-10L, BF-55L buffers.

4. Instruments: a) Model 5550 viscometer available from Chandler Engineering in Broken Arrow, Okla. (measures a viscosity profile and temperature over time under defined pressure), b) OFITE Model 900 viscometer available from OH Testing Equipment, Inc. in Houston, Tex. (measures viscosity of sample), and c) Cannon-Fenske Opaque (reverse-flow type) Calibrated Viscometer, size 100 P 398 glass available from Cannon Instrument Co. in State College, Pa. (measures density of a sample) were used to measure changes in viscosity of linear polymers.

Methods

1. Cross-linked Polymers: Evaluation of chlorophyll as a breaker using cross-linked polymers was carried out using different polymers (GW-3LDF guar at 22 gallons per thousand gallons (gpt) (for most of the experiments); GW-45 CMG at 25 gpt; CMC at 25 gpt; and HPG at 30 gpt) with their manufacturer recommended buffers and cross-linkers. Chlorophyll (5 or 10 gpt of the 10% wt./vol. extract) was used as breaker. The resulting slurry was tested at different temperatures (175° F. for most of the experiments) and variable pH to measure viscosity changes using the Chandler viscometer instrument.

2. Linear Polymer: Evaluation of chlorophyll as breaker for linear guar polymer at 20 and 17 gpt and 25 gpt linear CMG polymer was carried out using GW3-LDF and GW-45. Adding 5 or 10 gpt of 10% wt./vol. chlorophyll extract, the slurry was incubated at 150° F., and the intrinsic viscosity changes were measured using the densitometer. Conductivity of the GW-3LDF was also measured.

3. Chlorophyll concentration. Estimation of the total chlorophyll content in the various plant material extracts used for breaker evaluation is shown in Table 2. Estimation was carried out under methodology reported in the literature (Arnon, D. I., Copper Enzymes in Isolated Chloroplasts, Polyphenoloxidase In *Beta Vulgaris*, Plant Physiology, January 1949, vol. 24, no. 1, pp. 1-15.). Absorbance values at designated wavelengths of light were measured for 5 gpt and 10 gpt mixtures of water and the 10% wt./vol. extracts. Total chlorophyll concentration was estimated using an empirical formula in the literature based on the absorbance values.

Summary

The studies conducted showed that leaf extract or chlorophyll can function as a polymer breaker to reduce viscosity of fracturing fluids formulated with different polymers. Breaking, as indicated by a viscosity drop to less than about 10 cP at 100 $sec^{-1}$, was demonstrated at temperatures from 175 to 250° F. with a pH of 9.5-11 for cross-linked polymer and at temperatures from 150 to 175° F. with a pH of 9.5 to 11 (FIG. 3A) for linear polymer. The chlorophyll also showed successful reduction of molecular weights of linear polymers and showed 85% cleanup in conductivity tests. However, regain of viscosity was observed with commercially-sourced material on cooling the reactions, warranting further evaluation. Further conclusions are collected in Table 1. Test parameters are collected in Table 2.

TABLE 1

| Testing Name | Materials | Results | Comment |
| --- | --- | --- | --- |
| Breakage of Cross-linked Polymers | GW-3 and GW-45 | >90%. No regain on cooling. | GW-45 showed interference with cross-linking |
| | CMC | About 40% reduction | |
| | HPG | About 45% reduction | |
| Breakage of linear polymers | GW-3 and GW-45 | >90% >90% | $1.5 \times 10^6$ drop to 3,000 or 100,000 mol. wt. $3 \times 10^6$ drop to 4,500 mol. wt. |
| Commercial source chlorophyll | GW-3 used | Good performance with SUNNY GREEN, spinach, barley. Regain observed. | SUNNY GREEN = spinach > crepe myrtle > wheat (CN Lab, spirulina and alfalfa not good) |
| Temperature | GW-3 used | 175 & 200° F. good | Rapid breakage at 250° F. |
| pH range | GW-3 used | pH 9.5 to 10 ideal | Narrow pH Range |
| Conductivity test | GW-3 used | 85% regain conductivity | Good conductivity |
| Stability | Fresh and commercial | Fresh stable in refrigerator for 2 weeks. Commercial stable for at least one year. | Did not test stability of fresh chlorophyll at room temperature, as it changed color in 2 days. |

TABLE 2

| FIG. | Chl Material | Chl gpt | Chl conc. (mg/mL) | Polymer | pH | T (° F.) | Results |
|---|---|---|---|---|---|---|---|
| 1A | crepe myrtle 10% | 10 | 175-192 | xlink guar | 9.5 | 175 | broke; no regain |
| 1A | crepe myrtle 10% | 5 | 85-96 | xlink guar | 9.5 | 175 | broke slow; regain |
| 1B | live oak 10% | 10 | 43-45 | xlink guar | 9.5 | 175 | broke; no regain |
| 1B | live oak 10% | 5 | 21-23 | xlink guar | 9.5 | 175 | broke slow; regain |
| 1C | grass 10% | 10 | 48-51 | xlink guar | 9.5 | 175 | broke; regain |
| 1C | grass 10% | 5 | 24-25 | xlink guar | 9.5 | 175 | viscosity drop; regain |
| 2 | crepe myrtle 10% | 5 | 85-96 | xlink CMG | 5.44 | 200 | broke; no regain |
| 2 | crepe myrtle 10% | 2.5 | **42-48 | xlink CMG | 5.44 | 200 | broke; slight regain |
| 3A | crepe myrtle 10% | 10 | 175-192 | linear CMG | 4.8 | 175 | broke |
| 3A | crepe myrtle 10% | 5 | 85-96 | linear CMG | 4.8 | 175 | broke |
| 3A | crepe myrtle 10% | 10 | 175-192 | linear guar | 10.4 | 150 | broke |
| 3A | crepe myrtle 10% | 5 | 85-96 | linear guar | 10.4 | 150 | broke |
| 3B | crepe myrtle 10% | 10 | 175-192 | xlink guar | 9.5 | 175 | broke |
| 3B | crepe myrtle 10% | 5 | 85-96 | xlink guar | 9.5 | 175 | 50% viscosity drop |
| 4 | wheat pwdr 10% | 15 | unk | xlink guar | 9.5 | 175 | broke slow |
| 4 | spinach pwdr 10% | 15 | unk | xlink guar | 9.5 | 175 | broke |
| 4 | SUNNY GREEN | unk | 0.1 | xlink guar | 9.5 | 175 | broke |
| 4 | crepe myrtle 10% | 10 | 175-192 | xlink guar | 9.5 | 175 | broke |
| 5 | crepe myrtle 10% | 10 | 175-192 | guar | 9.0 | 175 | no xlinking occurred |
| 5 | crepe myrtle 10% | 10 | 175-192 | xlink guar | 9.5 | 175 | broke fast |
| 5 | crepe myrtle 10% | 10 | 175-192 | xlink guar | 10.0 | 175 | broke |
| 5 | crepe myrtle 10% | 10 | 175-192 | xlink guar | 11.0 | 175 | broke fast |
| 6 | crepe myrtle 10% | 10 | 175-192 | xlink guar | 9.5 | 150 | no viscosity change |
| 6 | crepe myrtle 10% | 10 | 175-192 | xlink guar | 9.5 | 175 | broke |
| 6 | crepe myrtle 10% | 10 | 175-192 | xlink guar | 9.5 | 200 | broke |
| 6 | crepe myrtle 10% | 10 | 175-192 | xlink guar | 9.5 | 250 | broke fast |
| 7A | crepe myrtle 10% | 10 | 175-192 | xlink CMC | 5 | 150 | 40% viscosity drop |
| 7B | crepe myrtle 10% | 20 | *350-384 | xlink HPG | 9.6 | 150 | 45% viscosity drop |
| 7B | crepe myrtle 10% | 10 | 175-192 | xlink HPG | 9.6 | 150 | viscosity drop |
| NA | crepe myrtle 10% | 10 | 175-192 | xlink guar | 9.5 | 175 | 2,000 psi; 85% conductivity increase |

*Estimated concentration based on 10 gpt analysis
**Estimated concentration based on 5 gpt analysis Example 1

Figure 1B:
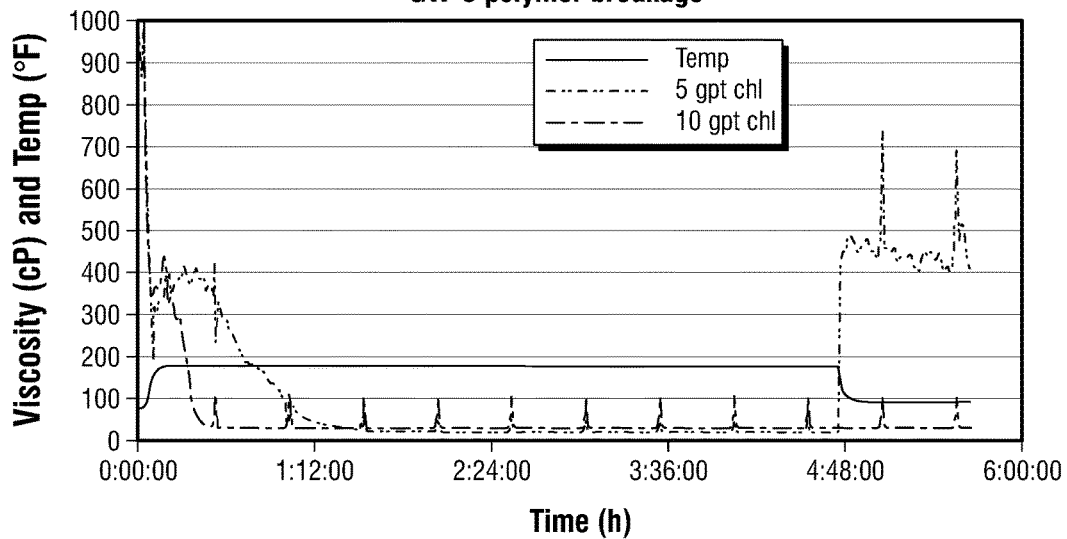
Figure 1C:
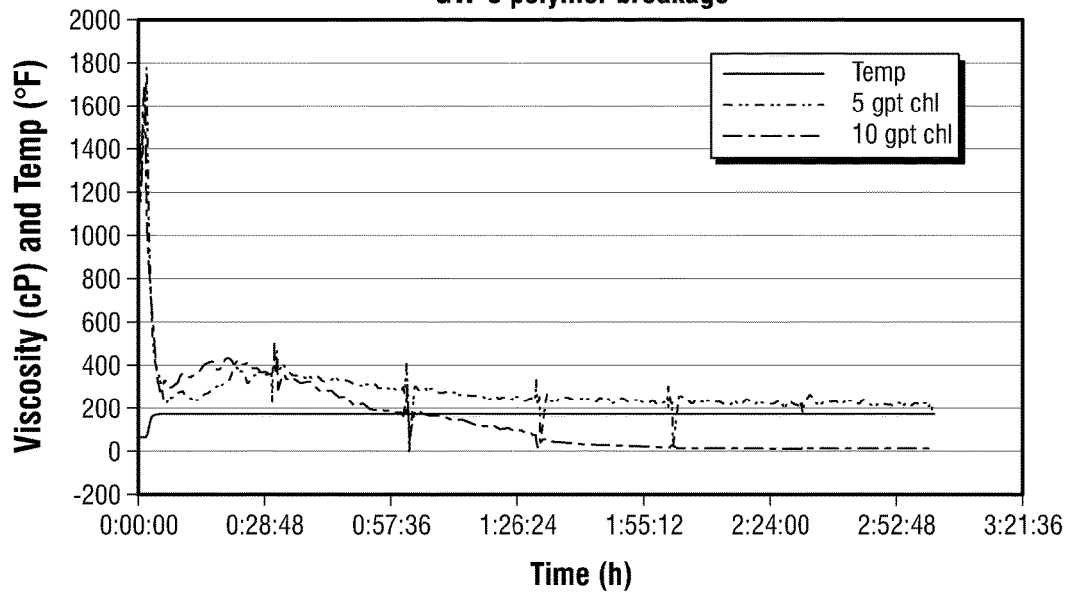

FIGS. 1A, 1B, and 1C show the effect of crepe myrtle (1A), live oak (1B), and St. Augustine grass (1C) chlorophyll extract in the breakage of cross-linked GW-3LDF guar polymer at a pH of 9.5. Results showed concentration dependent breakage of cross-linked guar polymer indicating slower breakage with 5 gpt and faster breakage with 10 gpt of 10% wt./vol. chlorophyll extract. Reduction in temperature after conducting reactions at 175° F. showed that the polymer regained its viscosity when 5 gpt chlorophyll was used. However, 10 gpt chlorophyll completely broke the polymer and no regain in fluid viscosity was observed. In the case of grass chlorophyll, the reduction in temperature after conducting reactions at 175° F. showed that the polymer regained its viscosity when 5 gpt or 10 gpt chlorophyll was used as breaker.

Example 2

Figure 2:
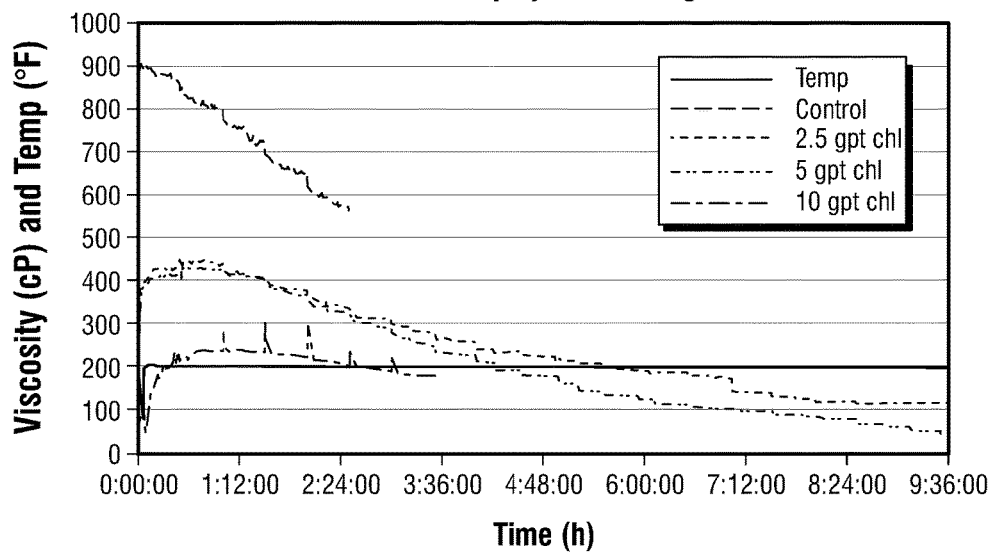

FIG. 2 shows the effect of crepe myrtle chlorophyll extract on the breakage of cross-linked GW-45 CMG polymer. Results showed concentration dependent breakage of cross-linked CMG polymer indicating slower breakage with 2.5 gpt (0.5 mL) and faster breakage with 5 gpt (1 mL) of 10% wt./vol. chlorophyll extract. Reduction in temperature after conducting reactions at 200° F. showed that the polymer had a slight regain in viscosity with 2.5 gpt chlorophyll, but almost no regain was seen with 5 gpt and 10 gpt.

Example 3

Figure 3A:
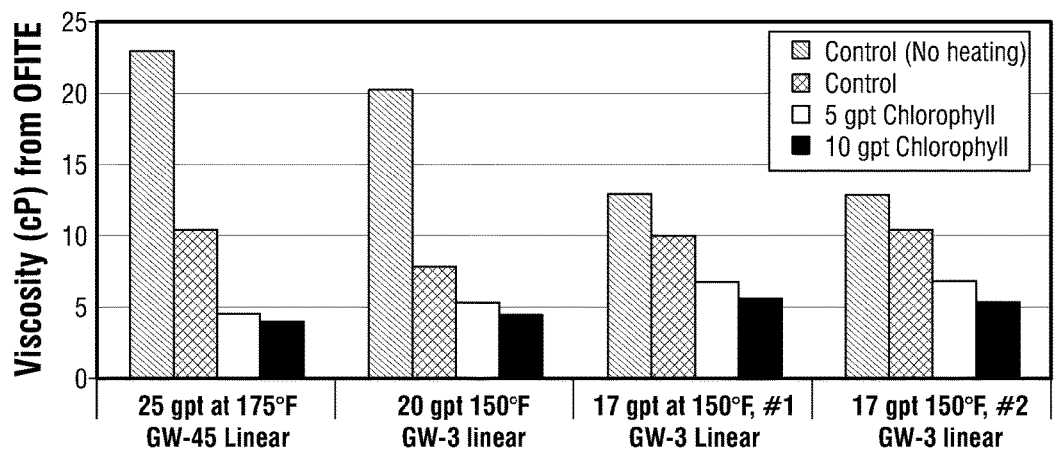
FIGS. 3A and 3B are bar graphs of viscosity for polymer-containing fluids prepared with rheology modifiers respective to Example 3.
Figure 3B:
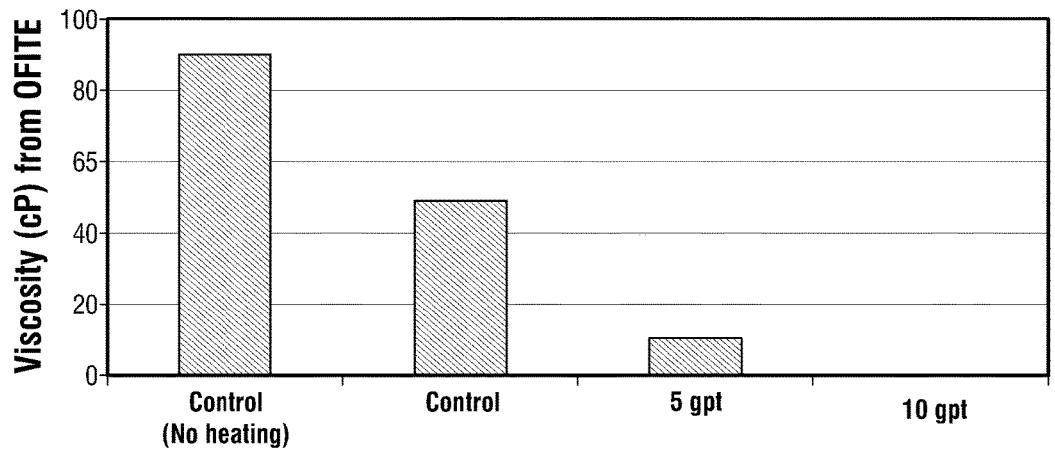

FIG. 3A shows the effect of 10% wt./vol. crepe myrtle chlorophyll extract on the breakage of linear GW-3LDF guar and GW-45 CMG polymers at 175 or 150° F. Both OFITE (bar diagrams) and densitometer intrinsic viscosity (Table 3) measurements were performed. FIG. 3B shows the effect of 10% wt./vol. crepe myrtle chlorophyll extract on the breakage of cross-linked GW-3LDF guar polymer at a pH of 9.5 and 175° F. OFITE measurements were performed. Results showed concentration dependent breakage indicating partial viscosity reduction with 5 gpt chlorophyll and complete viscosity reduction with 10 gpt chlorophyll.

TABLE 3

Molecular Weight Changes (Intrinsic Viscosity)

| | Breaker | | |
|---|---|---|---|
| | GW-45 CMG linear | GW-3LDF guar linear | GW-3LDF guar linear |
| Control | 3,042,000 | 1,472,312 | indeterminate |
| 5 gpt | 180,496 | 194,133 | 184,576 |
| 10 gpt | 4,780 | 137,784 | 3601 |

Example 4

Figure 4:
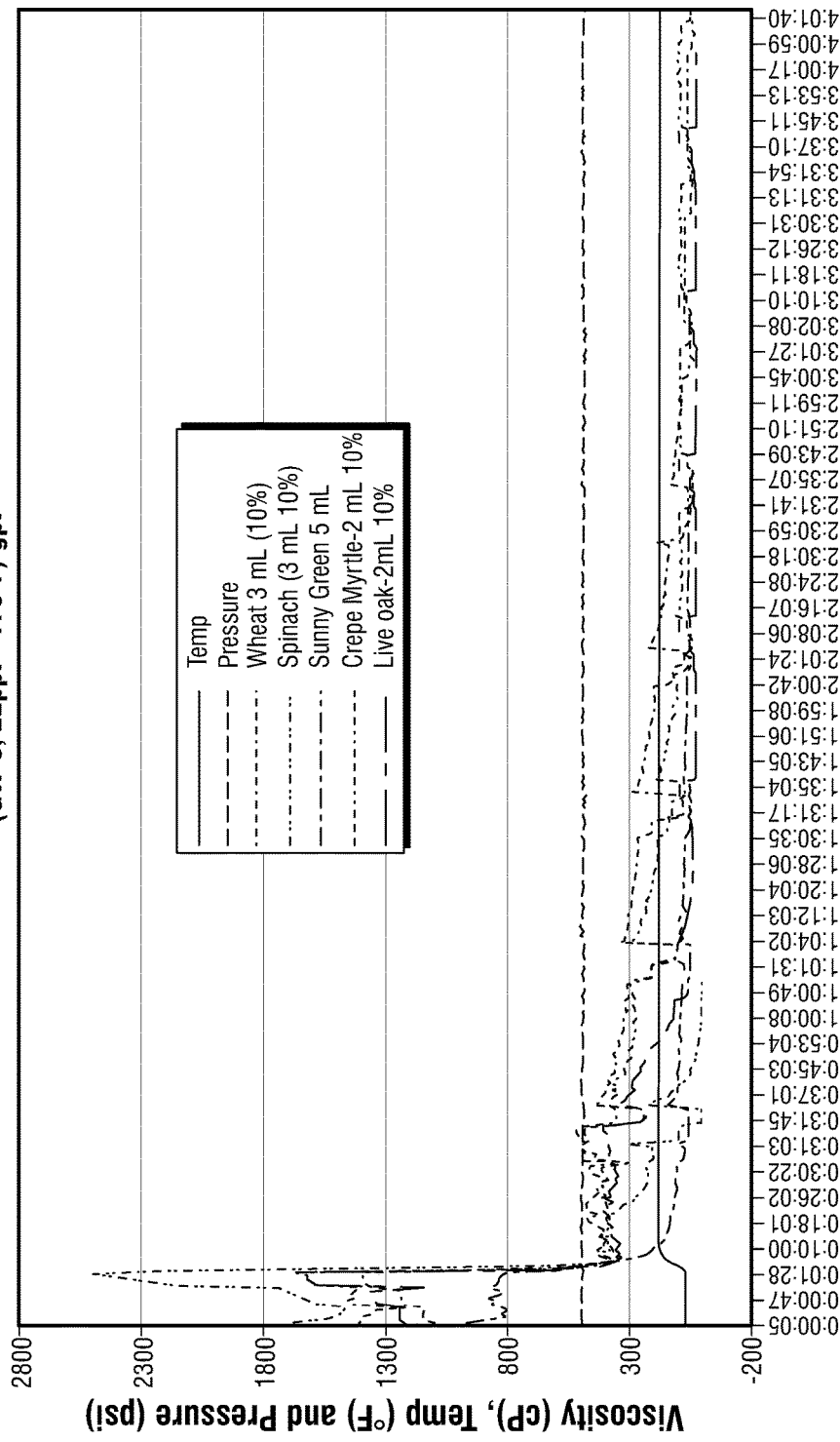

FIG. 4 shows an evaluation of different commercially available leaf powders on cross-linked 22 gpt GW-3LDF guar polymer at a pH of 9.5 and 175° F. compared to fresh 10% wt./vol. crepe myrtle chlorophyll extract. Results showed that commercially available barley (not in FIG. 4), spinach, and wheat leaf powders were successful in breaking the GW-3 polymers. SUNNY GREEN liquid with higher chlorophyll concentration showed fast reaction rates compared to all leaf powders tested. The polymer was broken once the temperature reached 175° F.

A 10% wt./vol. spinach powder extract at 15 gpt (3 mL) showed better reaction rates compared to all leaf powders tested. Rates were also better than 10% wt./vol. fresh crepe myrtle and live oak chlorophyll extract at 10 gpt (2 mL). A 10% wt./vol. wheat powder extract at 15 gpt (3 mL) showed reaction rates similar to crepe myrtle chlorophyll extract. Barley (not in FIG. 4) showed slow reaction rates and the polymer was broken relatively slowly. Regain in fluid viscosity (not in FIG. 4) was observed in most of the cases upon cooling. In summary, SUNNY GREEN and spinach performed the best, which was better than crepe myrtle, which was better than wheat. CN Lab, spirulina, and alfalfa were not effective.

Example 5

Figure 5:
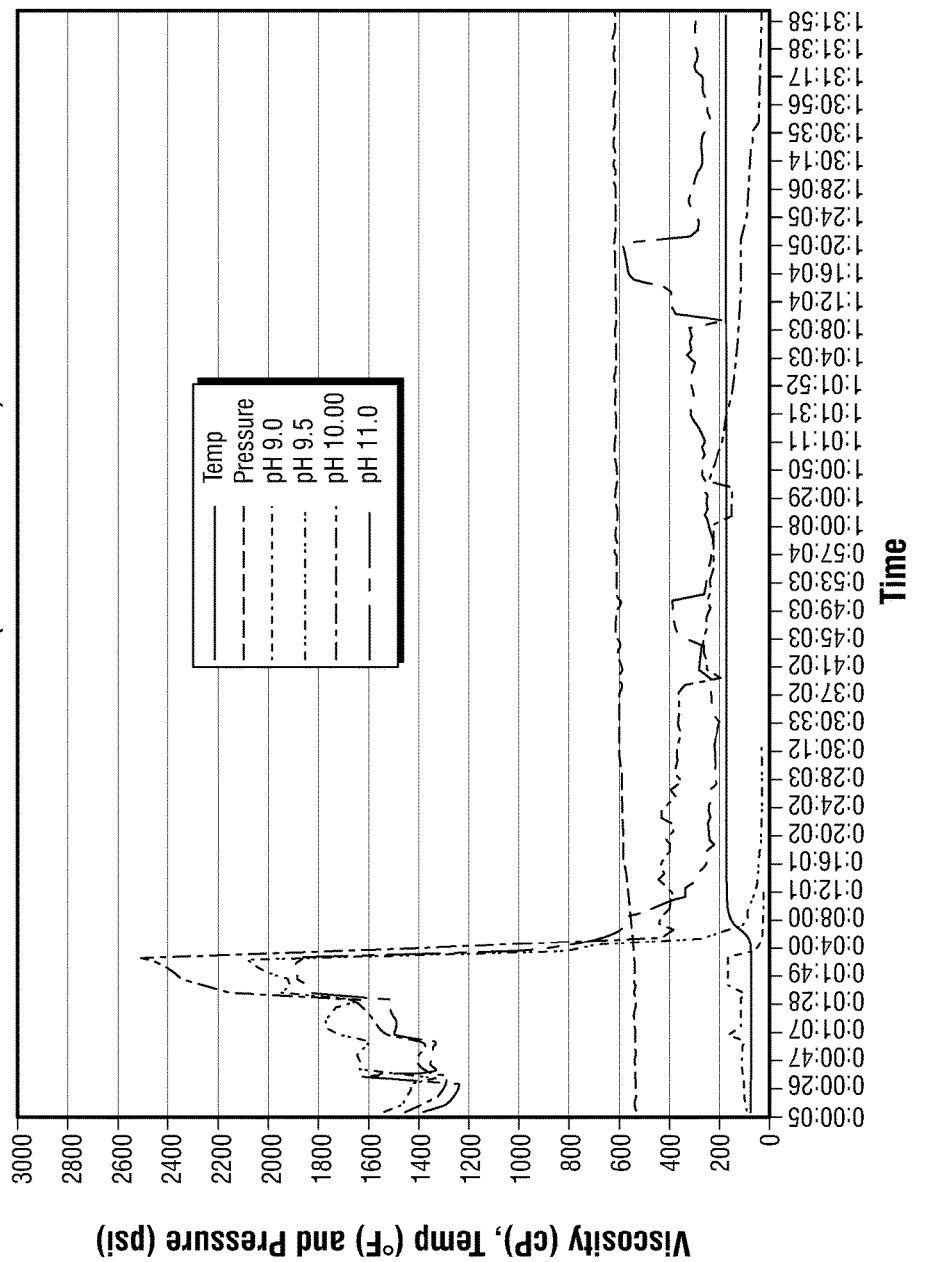

FIG. 5 shows the effect of pH on cross-linked GW-3LDF guar polymer breakage by 10% wt./vol. crepe myrtle chlorophyll extract at 10 gpt and 175° F. Results showed no cross-linking of polymer at pH 9.0, apparently from too low of pH for the borate cross-linker. The chlorophyll extract produced a beneficial breakage profile at pH 10.00, which included controlled breakage over time and viscosity reduction to the baseline. At the pH 11, the breakage was fast.

Example 6

Figure 6:
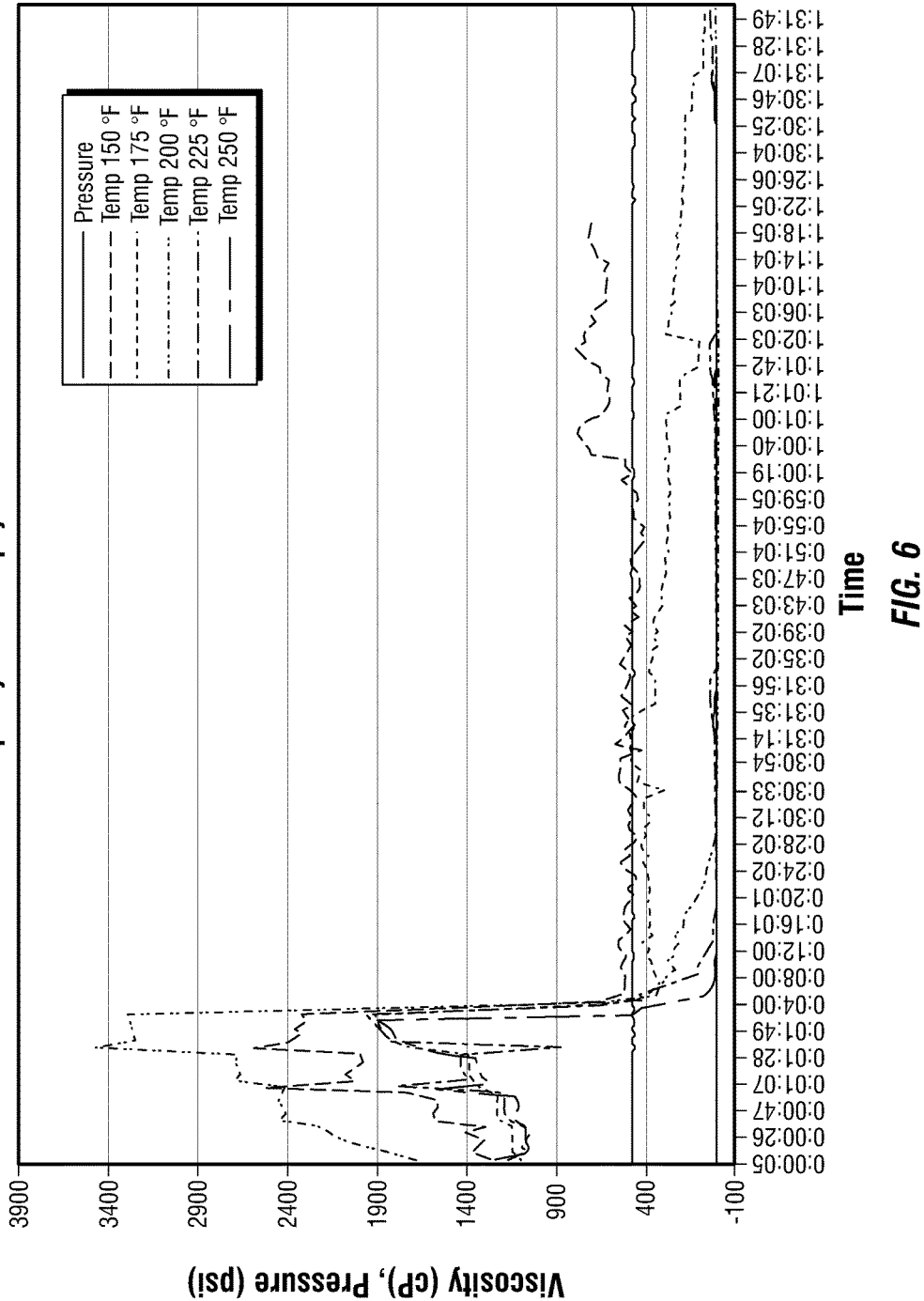

FIG. 6 shows the effect of temperature on cross-linked GW-3LDF guar polymer breakage by 10% wt./vol. crepe myrtle chlorophyll extract at 10 gpt at a pH of 9.5. Results showed no breakage at 150° F. in FIG. 6 while the chlorophyll extract showed a breakage profile at 175 and 200° F. and rapid breakage at 250° F.

Example 7

Figure 7A:
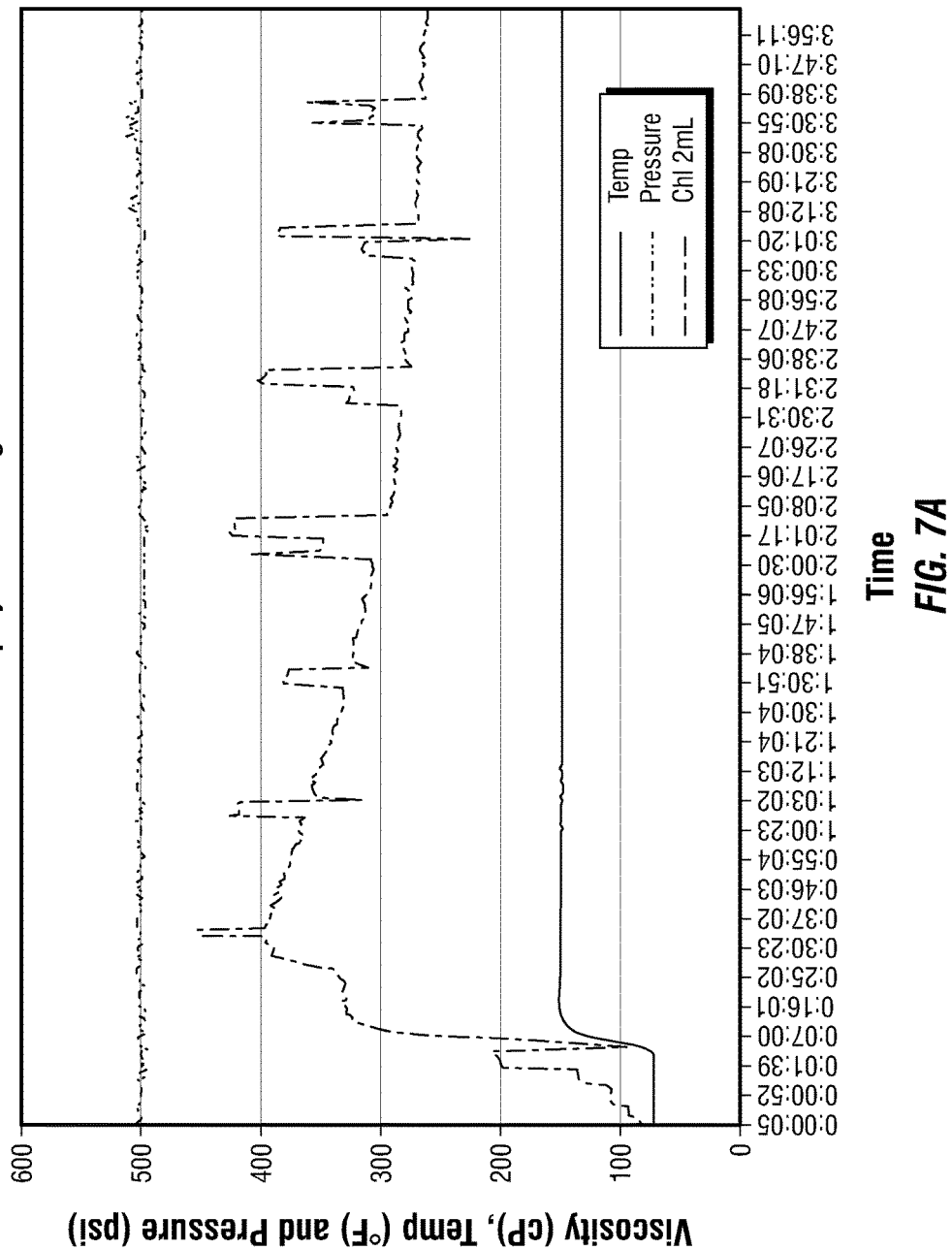
Figure 7B:
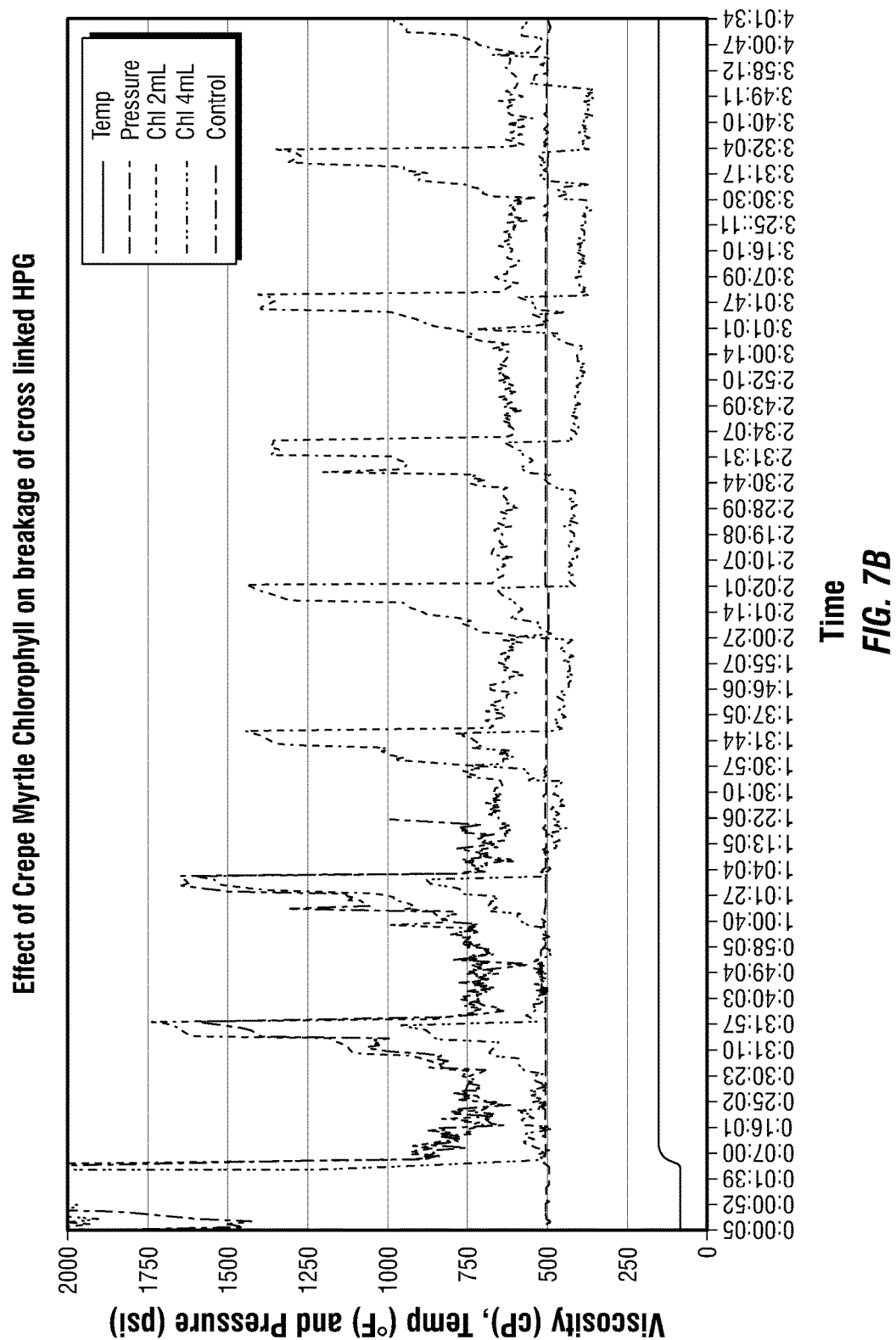

FIGS. 7A and 7B show the effect of 10% wt./vol. crepe myrtle chlorophyll extract on the breakage of CMC and HPG polymers at a pH of 5 and 9.6, respectively, and 150° F. In FIG. 7A, 10 gpt extract showed about 40% viscosity reduction for cross-linked CMC polymer. In FIG. 7B, 20 gpt (4 mL) extract showed about 45% viscosity reduction for cross-linked HPG polymer. Based on the cross-linked CMG results in FIG. 2 at 200° F., a higher temperature may produce breakage.

Example 8

The effect on conductivity of 10 gpt of 10% wt./vol. crepe myrtle extract was evaluated. Proppant (size 20/40 CARBO HSP sintered bauxite ceramic available from Carbo Ceramics in Houston, Tex.) was combined with 25 gpt of cross-linked GW-3LDF guar polymer at a pH of 9.5, 2,000 pounds per inch$^2$, and 175° F. Polymer breakage was observed as evidenced by 85% increase in conductivity after clean up processes and a high level of clean up apparent from visual inspection of proppant.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A hydrocarbon well fracturing fluid comprising:
an aqueous carrier fluid;
a cross-linker;
a polymer viscosifying agent cross-linked by the cross-linker;
chlorophyll; and
proppant.

2. The fluid of claim 1 further comprising a borate cross-linker, the polymer viscosifying agent being cross-linked and the hydrocarbon well treatment fluid exhibiting a pH of about 9 or greater.

3. The fluid of claim 2 wherein the chlorophyll is in the form of a liquid extract from plant material, with the plant material strained therefrom, providing a concentration of chlorophyll in the hydrocarbon well treatment fluid of about 200 mg/L or greater.

4. A hydrocarbon well treatment fluid comprising:
an aqueous carrier fluid;
a viscosifying agent exhibiting the property of attaining a first viscosity of the hydrocarbon well treatment fluid; and
chlorophyll;
the chlorophyll exhibiting the property of decreasing the first viscosity to a second viscosity less than the first viscosity.

5. The fluid of claim 4 wherein the viscosifying agent is a polymer viscosifying agent.

6. The fluid of claim 5 wherein the hydrocarbon well treatment fluid is a hydrocarbon well fracturing fluid further comprising a cross-linker and proppant, the polymer viscosifying agent being cross-linked.

7. The fluid of claim 6 wherein the cross-linker comprises borate.

8. The fluid of claim 4 wherein the chlorophyll is in the form of a liquid extract from plant material, with the plant material strained therefrom, providing a concentration of chlorophyll in the hydrocarbon well treatment fluid of about 200 mg/L or greater.

9. The fluid of claim 4 wherein the second viscosity is less than about 10 cP at 100 sec$^{-1}$.

10. The fluid of claim 4 wherein the viscosity-decreasing property of the chlorophyll is exhibited in the hydrocarbon well treatment fluid at a temperature of about 75° F. or greater and at a pressure greater than 15 psi.

11. The fluid of claim 4 wherein the viscosity-decreasing property of the chlorophyll is exhibited in the hydrocarbon well treatment fluid at a pH of about 8.5 or greater.

12. The fluid of claim 4 wherein the chlorophyll exhibits the property of maintaining the second viscosity after the decrease to the second viscosity.

13. The fluid of claim 12 wherein the second viscosity remains after the decrease to the second viscosity when the temperature of the hydrocarbon well treatment fluid decreases to less than 175° F.

14. A hydrocarbon well treatment fluid comprising:
an aqueous carrier fluid;
a polymer viscosifying agent exhibiting the property of attaining a first viscosity of the hydrocarbon well treatment fluid; and
chlorophyll;
the chlorophyll exhibiting the property of decreasing the first viscosity to a second viscosity less than the first viscosity at a temperature of about 150° F. or greater, at a pressure greater than 15 psi, and at a pH of about 9.5 or greater; and the chlorophyll exhibiting the property of maintaining the second viscosity after the decrease to the second viscosity when the temperature decreases to less than 175° F.

15. The fluid of claim 14 further comprising a borate cross-linker, the polymer viscosifying agent being cross-linked.

16. The fluid of claim 14 wherein the chlorophyll is in the form of a liquid extract from plant material, with the plant material strained therefrom, providing a concentration of chlorophyll in the well treatment fluid of about 200 mg/L or greater.

17. The fluid of claim 14 wherein the second viscosity is less than about 10 cP at 100 sec$^{-1}$.

18. The fluid of claim 14 wherein, for the property of decreasing viscosity, the temperature of about 150° F. or greater is about 150 to about 250° F., the pressure greater than 15 psi is greater than 100 psi, and the pH of about 9.5 or greater is about 9.5 to about 11.

* * * * *